Figure 1:
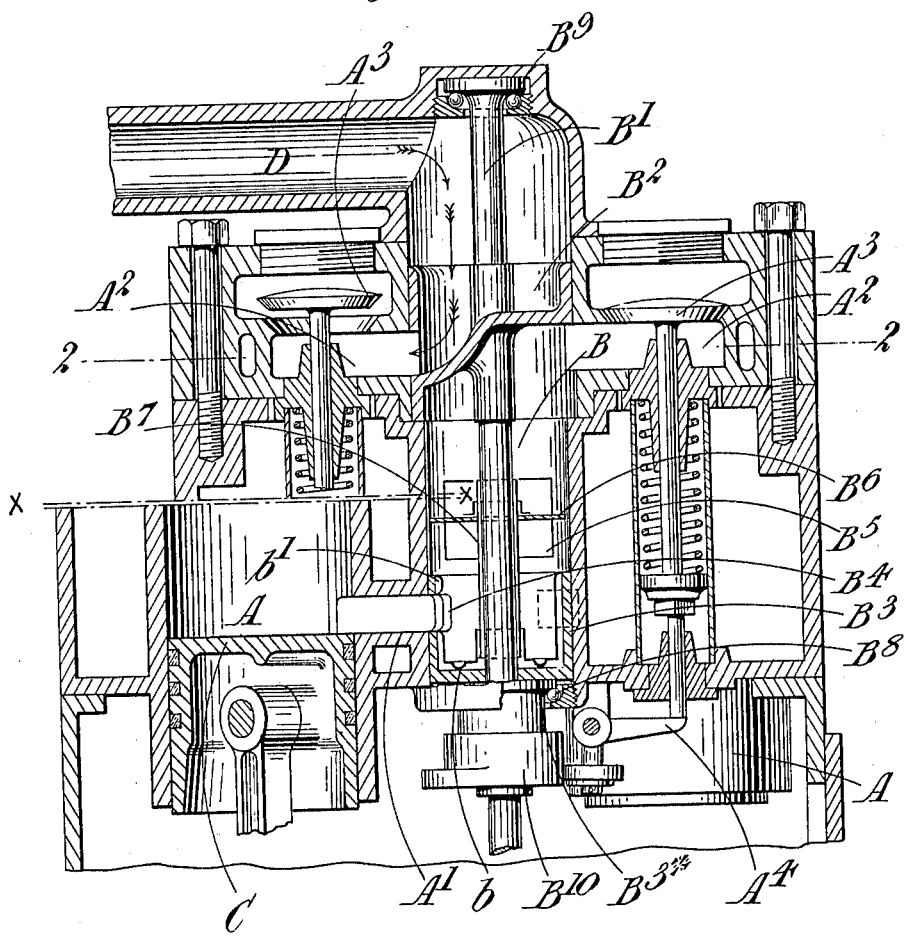

W. J. ROBB & W. H. WELCH.
INTERNAL COMBUSTION ENGINE.
APPLICATION FILED OCT. 7, 1912.

1,096,952.

Patented May 19, 1914.
4 SHEETS—SHEET 1.

W. J. ROBB & W. H. WELCH.
INTERNAL COMBUSTION ENGINE.
APPLICATION FILED OCT. 7, 1912.
1,096,952.
Patented May 19, 1914.
4 SHEETS—SHEET 2.
Fig. 2.
Fig. 3.
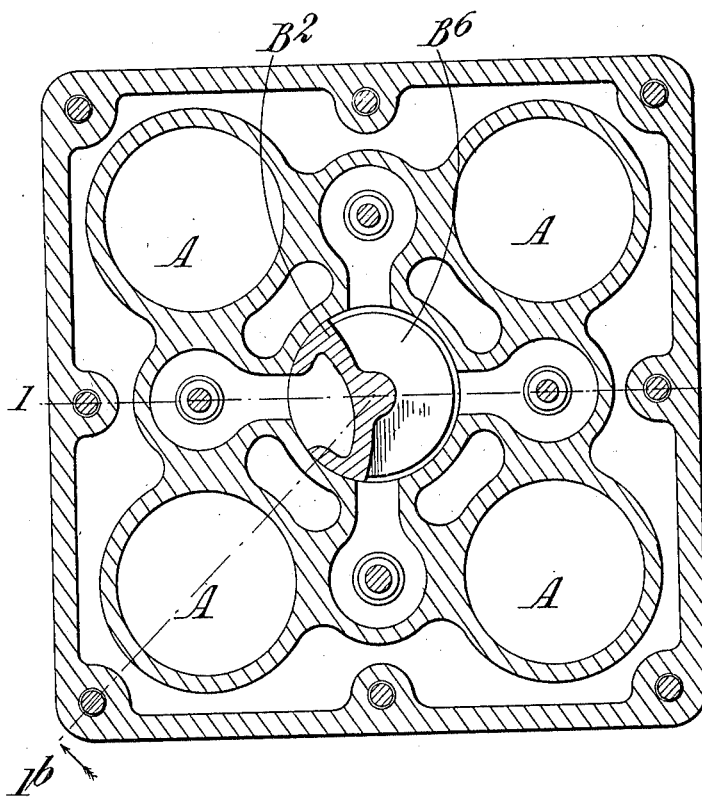
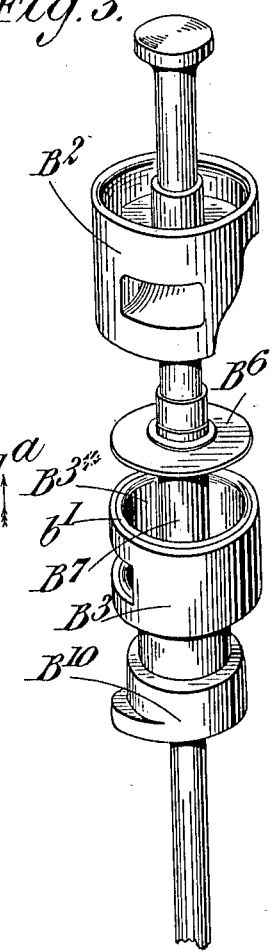
Witnesses:
Harry C Lewis
Kenneth D Widdiem
Inventors:
William John Robb
Walter Henry Welch
by Henry D Williams
Attorney.

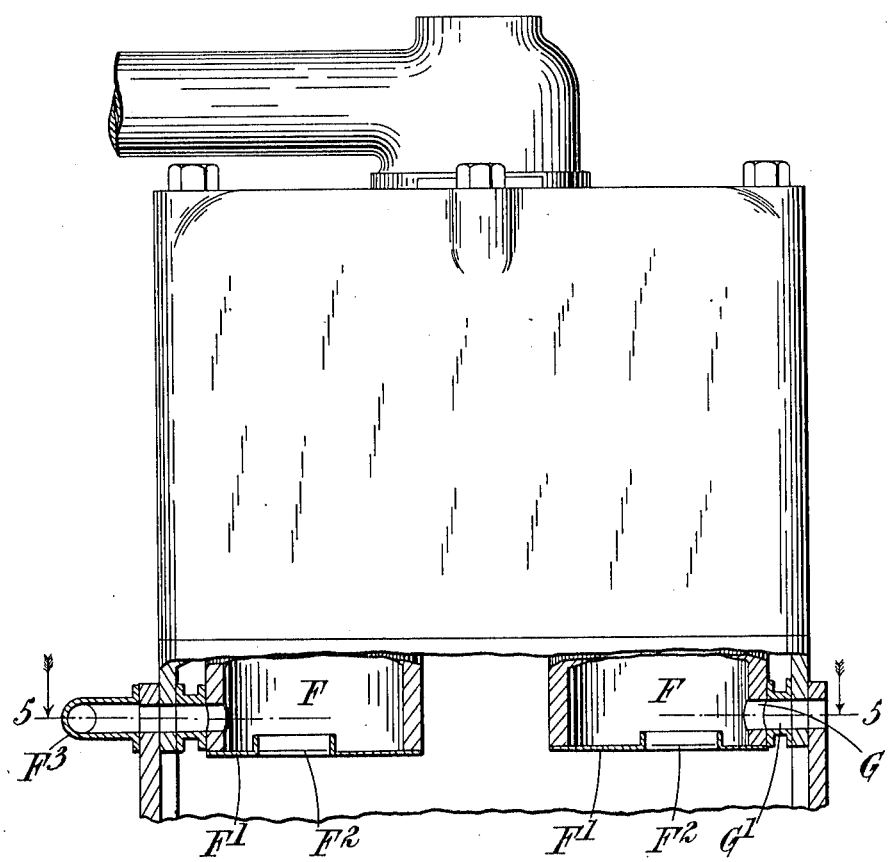

W. J. ROBB & W. H. WELCH.
INTERNAL COMBUSTION ENGINE.
APPLICATION FILED OCT. 7, 1912.
1,096,952.
Patented May 19, 1914.
4 SHEETS—SHEET 4.
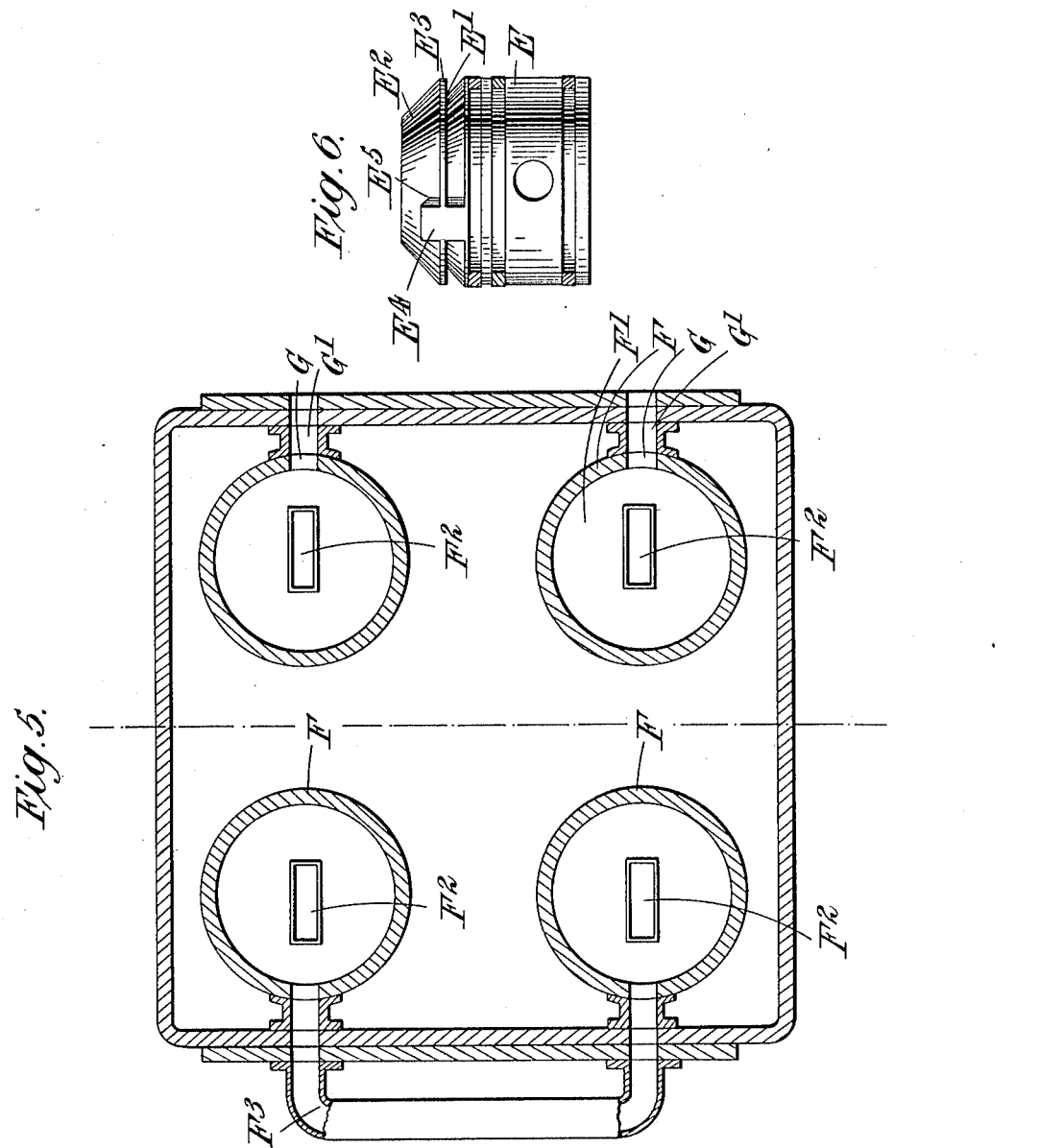
Witnesses:
Harry C. Lewis
Kenneth P. Widdemer
Inventors:
William John Robb
Walter Henry Welch
by Henry D. Williams
Attorney.

UNITED STATES PATENT OFFICE.

WILLIAM JOHN ROBB AND WALTER HENRY WELCH, OF BRISTOL, ENGLAND, ASSIGNORS TO BANNER MOTORS LIMITED, OF BRISTOL, ENGLAND.

INTERNAL-COMBUSTION ENGINE.

1,096,952.   Specification of Letters Patent.   Patented May 19, 1914.

Application filed October 7, 1912. Serial No. 724,236.

*To all whom it may concern:*

Be it known that we, WILLIAM JOHN ROBB and WALTER HENRY WELCH, subjects of the King of England, both residing at Bristol, Gloucestershire, England, have invented certain new and useful Improvements in Internal-Combustion Engines, of which the following is a specification.

This invention is for improvements in or relating to internal combustion engines, particularly those wherein rotary valves are employed, and has for one of its objects to provide means whereby such valves can be used without their becoming overheated and without necessitating careful fitting. Some parts of the invention, however, are not restricted to rotary valves.

As is well known, a rotary valve, if used for the exhaust, is likely to become unduly heated so that it soon ceases to operate properly, and also the manufacture of such valves is usually costly because they require careful fitting to prevent leakage.

According to one feature of this invention, the engine is provided with a piston-controlled exhaust port which is further controlled by a mechanically-operated valve. This valve may take the form of a rotary valve and by means of this double control the port can be timed to open and close as required, such timing not being restricted absolutely to the movements of the piston and yet an inexpensive rotary valve can be employed because close fitting is unnecessary. It will be appreciated that the piston necessarily fits its cylinder properly in any case, and as the rotary valve will only be serving to close the port alone during a short interval, for instance its opening may be delayed until the piston has passed the port and just arrived at the end of its stroke or at any other moment found most convenient, no accurate fitting is required. An engine provided with this double-control exhaust-port may have a second port which serves as a combined inlet and auxiliary exhaust port controlled by a distributer-valve which puts this port alternately into communication with the inlet and exhaust conduits; this distributer-valve being set to open for exhaust after the piston-controlled exhaust-port has been opened.

The invention further relates to details of construction in connection with these valves and other details of construction all of which apparatus is hereinafter fully described and the novel features thereof pointed out in the claims.

In the accompanying drawings:—Figure 1 is a vertical section through the upper part of the engine in the plane of the central valve axle. The part of this figure above the line $x$—$x$ is taken on the plane indicated by the line 1—$1^a$ of Fig. 2, and the part below the line $x$—$x$ is taken on the line $1^a$—$1^b$ of Fig. 2. Fig. 2 is a section on the line 2—2 of Fig. 1; Fig. 3 is a perspective view of a detail; Fig. 4 is an elevation in part section of the upper part of the engine showing a further feature of the present invention; Fig. 5 is a section on the line 5—5 of Fig. 4, and Fig. 6 shows in elevation a piston-head constructed according to another feature of the present invention.

Like letters indicate like parts throughout the drawings.

The engine may have one or more cylinders A, a convenient number being four, arranged in the form of a square as shown in Fig. 2. Situated centrally between the cylinders is a cylindrical chamber B and extending through this chamber and concentric with its axis is a spindle $B^1$ carrying two rotary valves $B^2$ and $B^3$ respectively. Each cylinder has an exhaust port $A^1$ which is covered and uncovered by its piston C, but is further controlled by the rotary valve $B^3$. This valve conveniently takes the form of a cylindrical cup situated at the bottom of the chamber B and having in its wall a port $B^4$ which registers with each port $A^1$ in turn. The valve $B^2$ places each port $A^2$ of each cylinder alternately in connection with the inlet conduit D and the exhaust conduit of which the central portion of the chamber B forms a part. Each port $A^2$ thus acts as a combined inlet and exhaust port and may be further controlled by a mushroom or other mechanically-operated valve $A^3$. Approximately midway between the valves $B^2$ and $B^3$, an exhaust port $B^5$ is situated whence the gases may escape through any convenient channel to the atmosphere, and a circular baffle $B^6$ is situated opposite this port to direct the gases discharging from the ports $A^1$ and $A^2$ of the cylinders to the port $B^5$. The cup-shaped valve $B^3$ has in its interior a comparatively thin lining $B^{3*}$ which is spaced away from the walls of the valve $B^3$, for example by projections $b$ at the bottom and by an outwardly turned lip $b'$ at the top. An air space is thus left between the thin liner and the walls of the valve which is found to be beneficial in preventing the valve from getting over-heated. Supported from the valve is a tube $B^7$ which surrounds the spindle $B^1$ and carries the circular baffle $B^6$. Conveniently the spindle $B^1$ is mounted in ball-bearings $B^8$, $B^9$ and carries a cam $B^{10}$ for operating bell-crank levers $A^4$ which left the puppet valves $A^3$.

The operation of this part of the invention is as follows:—As each piston C nears the end of its outstroke, it uncovers the port $A^1$ of its cylinder and when the port is completely opened (or any time before or after such complete opening as may be found most convenient) the port $B^4$ of the rotary valve $B^3$ is brought into register with the port $A^1$ so that the exhaust gases can escape into the chamber B and thence through the port $B^5$ to the atmosphere. The hottest of the gases are thus disposed of and soon after the exhaust through the port $A^1$, the double-acting valve $B^2$ puts the port $A^2$ into communication with the chamber B, the puppet valve $A^3$ being also opened. The auxiliary exhaust can thus take place from the port $A^2$ which serves as a combined inlet and exhaust port so that a large portage is provided to quickly get rid of the exhaust gases. The arrangement further has the advantage that by disposing of the hottest of the gases through the valve $B^3$, the valves $A^3$ and $B^2$ which together serve as the inlet valves, are exposed to less heat than they would be if all the exhaust took place through them only. This is important because leakage must not take place through the inlet-valves if proper efficiency is to be obtained, whereas even though the exhaust-valve $B^3$, which is exposed to the greatest heat, may become somewhat damaged by heat, no leakage can take place past the same except during very short intervals because the port $A^1$ during the greater part of the stroke of the piston is covered by the piston. The valve arrangement altogether is efficient in working and inexpensive in construction as no accurate fitting is required either for the valve $B^2$ or $B^3$, the valves $A^3$ and the piston being depended upon for effecting proper sealing. It also insures quiet working as the exhaust pressure has been relieved before $A^3$ is lifted.

It is found with this engine that when oil collects on the front or working face of the piston, it is liable to be swept out by the hot exhaust gases through the port $A^1$; hence it is of particular importance in this engine to avoid if possible the collection of oil in this manner. The collecting of the lubricant in front of a piston is due to two causes, (1) the scraping action of the edge of the piston along the cylinder walls scraping off the lubricant therefrom and collecting it in front of it, and (2) the tendency for air, laden with lubricant from the closed crank-chamber (which it is preferred to employ with the engine) to be sucked in behind the piston during its in-stroke and then to be forced past the piston during the out-stroke. In the engine of the present invention, the presence of the exhaust port $A^1$ renders it particularly undesirable that any lubricating oil should collect on the working face of the piston, as oil thus collecting would be blown out through this exhaust port and wasted. Special means, now to be described, are provided for preventing oil collecting on the working face of the piston. To obviate the first difficulty, the piston head is preferably so shaped, as shown in Fig. 6, as to prevent oil passing from below the piston past the piston into the combustion space, whence it would be blown out through the exhaust port $A^1$ and wasted. The piston-head E, Fig. 6, is provided with a circumferential groove $E^1$ just at the rear of the front face and the face is beveled at $E^2$, or its whole surface may be domed or otherwise shaped to present a sloping surface tending to direct the oil to the groove $E^1$ at its rear. The grooved portion of the piston is tapered as shown in the drawings, its larger end being remote from the front face of the piston so that the lubricant will tend to pass over the larger end of the rear of the piston but be checked by the shoulder constituting the front wall of the groove from passing to the front face of the piston. With a piston-head shaped in this manner, it will be seen that any lubricant collecting on its face will drain to the edge $E^3$ and the pressures of compression and explosion will always tend to force the lubricant around this narrow edge into the groove $E^1$. It is found in practice that this construction keeps the lubricant back from the front face and once having entered the groove $E^1$ it is carried with the piston and the pressures in front of the piston always tend to force it back farther over the whole body of the piston, so that this is kept well lubricated without waste of oil. Where a piston of this kind is used with the engine described above, a solid portion $E^4$ is provided for covering and uncovering the port $A^1$, as it would obviously interfere with the control of the port if the groove $E^1$ were extended around that portion of the piston-head which is opposite the port. The front face of this solid portion is also curved as shown at $E^5$ in such manner as to drain the lubricant down to the edge $E^3$.

To obviate the excess of lubricant on the cylinder walls which may arise from the oil-laden air of the crank chamber being sucked in the wake of an ascending piston, it is common practice to introduce a baffle at the end of the cylinder with a slot for the piston-rod to work in, but although this may cut off a direct splash of oil it has the disadvantage that the air drawn into the cylinder as the piston performs its in-stroke still comes from the crank-chamber, further that on the out-stroke of the piston the displaced air being forced through a small slot the air pressure just below the piston is greatly increased tending to force an excess of oil past the sides of the piston besides increasing the total engine friction. In the present invention this second difficulty is effectively obviated by improved means for preventing the oil from being carried up from the crank chamber onto the cylinder walls whence it could escape past the piston into the combustion space and thence be blown out through the exhaust port $A^1$. To obviate this action a passage is provided (according to this invention) from the lower part of a cylinder to the outside air or to a chamber not in communication with the crank-case, and in the latter case such chamber may be another cylinder whose piston moves in opposite phase. The result in either case being that the air circulation due to the movement of the piston does not give rise to a strong current through the slot. Two methods of carrying out this part of the invention are shown diagrammatically in Figs. 4 and 5. The ends of the cylinders F are closed by baffles $F^1$ slotted at $F^2$ to permit the passage of the piston-rods and a conduit $F^3$ connects the interior of one cylinder with the interior of the next, so that each of these cylinders constitutes an air-receiving chamber for the other. The pistons of the cylinders thus connected are working in opposite phase so that as one piston is performing its out-stroke and forcing air out of the cylinder, the other is performing its instroke and sucking air in. The air from one cylinder will therefore pass freely into the next cylinder without disturbing the air in the crank-chamber and also will not be charged with lubricant because it is screened from the splash lubrication taking place in the crank-chamber, by the baffles $F^1$.

Instead of the conduit $F^3$, apertures G may be provided in the sides of the cylinders and arranged to communicate by short conduits $G^1$ with the atmosphere outside the crank-case. With this arrangement fresh air which cannot be charged with lubricant, is drawn into the cylinders at each in-stroke of the piston and no resistance is offered to the expulsion of such air so that the lubricant around the piston does not tend to be forced forward over the same to the front face.

It will be understood that the invention is not restricted to the particular form of engine with reference to which it has been described, which is only illustrated by way of example and not by way of limitation. Obviously instead of a single port $A^1$ for each cylinder, a series of ports may be provided if desired, all communicating with a single passageway to the valve $B^3$ so that they can together be controlled by the port $B^4$ of the valve.

What we claim as our invention and desire to secure by Letters Patent is:—

1. In an internal combustion engine, the combination of a plurality of cylinders each provided with an exhaust-port near the crank-chamber end of the working portion and each also provided with a second port in the combustion chamber, a piston reciprocating within each cylinder and controlling said exhaust-port, a mechanically-operated valve common to all cylinders also controlling said exhaust-port for each cylinder, inlet and exhaust conduits, and a distributer valve in common for the cylinders operatively connecting said conduits for each cylinder alternately to said second cylinder port.

2. In an internal combustion engine, the combination of a working cylinder having a port at the head end and an exhaust-port near the other end, a piston reciprocating within the cylinder and controlling said exhaust-port, a cylindrical chamber adjacent to said cylinder, a rotary valve within said chamber also controlling said exhaust-port, inlet and exhaust conduits, and a distributer valve also within said chamber operatively connecting said conduits alternately to said port in the cylinder head.

3. In an internal combustion engine, the combination of a working cylinder having a port at the head end and an exhaust-port near the other end, a piston reciprocating within the cylinder and controlling said exhaust-port, a cylindrical chamber adjacent to said cylinder and having an exhaust-port in its wall intermediate of its ends, a spindle rotatably mounted in said chamber, a distributer valve mounted on said spindle and controlling said first port, a rotary valve also mounted on said spindle and controlling said cylinder exhaust-port, and a transverse baffle disposed in said chamber between the two valves and opposite said exhaust-port in the chamber.

4. In an internal combustion engine, the combination of a working cylinder having a port at the head end and an exhaust-port near the other end, a piston reciprocating within the cylinder and controlling said exhaust-port, a cylindrical chamber adjacent to said cylinder and having in its wall an exhaust-port intermediate of its ends, a spindle rotatably mounted in said chamber, a distributer valve mounted on said spindle and controlling said first-mentioned port, a cup-shaped rotary valve carried by said spindle, a liner within said valve but spaced away therefrom, said valve and liner being provided with registering ports to control said cylinder exhaust-port, and a transverse baffle disposed in said chamber between the two valves and opposite said exhaust-port in the chamber.

5. In an internal combustion engine, the combination of a plurality of working cylinders each having a port at the head end and an exhaust-port near the other end, a piston reciprocating within each cylinder and controlling the exhaust-port therein, a cylindrical chamber adjacent to said cylinders and having an exhaust-port intermediate of its ends there being provided, a series of ports in said chamber communicating with said exhaust-ports in said cylinders, a spindle rotatably mounted in said chamber, a distributer valve mounted on said spindle and controlling said first-mentioned ports in the cylinders, a puppet-valve also controlling each of said first mentioned ports, a cup-shaped rotary valve also mounted on said spindle, a liner within said valve but spaced away therefrom, said valve and liner being situated within said chamber and provided with registering ports for controlling said series of ports therein, and a transverse baffle disposed in said chamber between said distributer valve and said cup-shaped valve and opposite said exhaust-port in the chamber, substantially as described.

6. In an internal combustion engine, the combination of a working cylinder having a port at the head end and an exhaust-port near the other end, a piston reciprocating within the cylinder and controlling said exhaust-port, a cylindrical chamber adjacent to said cylinder and having an exhaust port in its wall intermediate of its ends, a spindle rotatably mounted in said chamber, a distributer valve mounted on said spindle and controlling said first port, and a rotary valve also mounted on said spindle and controlling said cylinder exhaust-port.

7. In an internal combustion engine, the combination of a working cylinder having a port at the head end and an exhaust-port near the other end, a piston reciprocating within the cylinder and controlling said exhaust-port, a cylindrical chamber adjacent to said cylinder and having in its wall an exhaust-port intermediate of its ends, a spindle rotatably mounted in said chamber, a distributer valve mounted on said spindle and controlling said first-mentioned port, a cup-shaped rotary valve carried by said spindle within said chamber, and a liner within said valve but spaced away therefrom, said valve and liner being provided with registering ports to control said cylinder exhaust-port.

8. In an internal combustion engine, the combination of a plurality of working cylinders each having a port at the head end and an exhaust-port near the other end, a piston reciprocating within each cylinder and controlling the exhaust-port therein, a cylindrical chamber adjacent to said cylinders and having an exhaust-port intermediate of its ends, there being provided a series of ports in said chamber communicating with said exhaust-ports in said cylinders, a spindle rotatably mounted in said chamber, a distributer valve mounted on said spindle and controlling said first-mentioned ports in the cylinders, a puppet-valve also controlling each of said first-mentioned ports and a rotary valve also mounted on said spindle within said chamber for controlling said exhaust-ports in the cylinders.

In testimony whereof we have signed our names to this specification in the presence of two subscribing witnesses.

WILLIAM JOHN ROBB.
WALTER HENRY WELCH.

Witnesses:
E. J. FUSSELL,
E. TYCER.

---

Copies of this patent may be obtained for five cents each, by addressing the "Commissioner of Patents, Washington, D. C."